(12) United States Patent
Gaal

(10) Patent No.: US 6,760,582 B2
(45) Date of Patent: Jul. 6, 2004

(54) METHOD AND APPARATUS FOR TESTING ASSISTED POSITION LOCATION CAPABLE DEVICES

(75) Inventor: Peter Gaal, San Diego, CA (US)

(73) Assignee: Qualcomm Incorporated

( * ) Notice: Subject to any disclaimer, the term of this patent is extended or adjusted under 35 U.S.C. 154(b) by 213 days.

(21) Appl. No.: 10/067,588

(22) Filed: Feb. 4, 2002

(65) Prior Publication Data

US 2003/0148761 A1 Aug. 7, 2003

(51) Int. Cl.[7] .............................. H04Q 7/20; H04Q 7/10; G01S 7/14; G06F 19/00
(52) U.S. Cl. ................ 455/423; 455/67.11; 455/67.14; 455/404.2; 342/165; 342/357.06; 702/118; 702/119; 701/213
(58) Field of Search .......................... 455/67.11, 67.14, 455/67.16, 423, 424, 425, 427, 115.1, 115.2, 115.3, 226.1, 404.2, 422.1, 426.1; 342/165, 173, 357.06, 451, 452, 169, 357.08, 357.12; 701/213; 702/108, 117, 122, 119

(56) References Cited

U.S. PATENT DOCUMENTS

| | | | |
|---|---|---|---|
| 5,841,396 A | 11/1998 | Krasner | 342/357 |
| 5,922,041 A | * 7/1999 | Anderson | 701/200 |
| 5,977,913 A | * 11/1999 | Christ | 342/465 |
| 6,114,989 A | * 9/2000 | Fontes et al. | 342/357.06 |
| 6,208,289 B1 | 3/2001 | Haendel | 342/357.03 |
| 6,571,082 B1 | * 5/2003 | Rahman et al. | 455/67.11 |

OTHER PUBLICATIONS

Rebecca Boucher: "Spirent Communications Delivers Automatic Test Solution for E911 Handset", Spirent Communications, Online!, Oct. 1, 2001, XP002248176, pp. 1–2.
Anonymous: "Position Location Test System PLTS", Spirent Communications, Online!, retrieved on internet Jun. 24, 2003, pp. 1–8.

* cited by examiner

*Primary Examiner*—Binh Tieu
(74) *Attorney, Agent, or Firm*—Philip Wadsworth; Charles Brown; Donald Kordich

(57) ABSTRACT

A method and apparatus for testing assisted position location capable devices that includes providing a position determination entity (PDE) simulator that is in communication with a base station simulator simulating one or more base stations and connecting an assisted position location capable device under test (DUT) to the base station simulator and a global positioning system (GPS) simulator. Then, initiating a test sequence wherein the DUT receives a set of predetermined GPS signals and at a desired time the DUT requests assistance data from the base station simulator and the base station simulator requests assistance data from the PDE simulator, wherein the PDE simulator provides data that is independent of the GPS simulator data to the base station and the base station transfers the PDE data to the DUT. The PDE data is a set of predetermined responses to any one of a plurality of DUT requests indexed by elapsed test time.

8 Claims, 9 Drawing Sheets

| MS REQUEST | PDE RESPONSE | NOTES |
|---|---|---|
| REQUEST BS CAPABILITIES | PROVIDE BS CAPABILITIES | $N_{resp} = 1$<br>BS_LS_REV = '000000'<br>GPSCID = '1'<br>AFLTC_ID = '1'<br>APDC_ID = '00000000' |
| REQUEST GPS ACQUISITION ASSISTANCE | PROVIDE GPS ACQUISITION ASSISTANCE | $N_{resp} = T_{test}/1.28$<br>(TIME_OF_APP HAS 1.28 s RESOLUTION)<br>TIME_OF_APP > $T_{req}$ +3<br>DOPP_INCL = '1'<br>CODE_PH_PAR_INCL = '1'<br>REFERENCE_PN = $PN_{ref}$<br>AZ EL INCL = '1' |
| REQUEST GPS LOCATION ASSISTANCE | PROVIDE GPS LOCATION ASSISTANCE<br><br>CARTESIAN IF COORD_TYPE='0'<br>SPHERICAL IF COORD_TYP='1' | $N_{resp} = T_{test}/1.28$<br>(ATTACHED TO GPS ACQUISITION ASSISTANCE MESSAGE)<br>LAT_REF = $LAT_{ref}$<br>LONG_REF = $LONG_{ref}$<br>HEIGHT_REF = $LONG_{ref}$<br>NUM DLY = '000' |
| REQUEST GPS SENSITIVITY ASSISTANCE | PROVIDE GPS SENSITIVITY ASSISTANCE | $N_{resp} = T_{test}/6$<br>$T_{req} + 5 \leq$ TIME OF REF_BIT_NUM<br>$< T_{req} + 11$<br>REF_BIT_NUM =<br>    254 = '00011111110'<br>OR   554 = '01000101010'<br>OR   854 = '01101010110'<br>OR  1154 = '10010000010'<br>OR  1454 = '10110101110'<br>DR_SIZE = '11111111' (510 BITS) |
| REQUEST BASE STATION ALMANAC | PROVIDE BASE STATION ALMANAC | $N_{resp} = 1$<br>REF_PN = $PN_{ref}$<br>LAT_REF = $LAT_{ref}$<br>LONG_REF = $LONG_{ref}$<br>HEIGHT_REF = $HEIGHT_{ref}$ + $OFFSET_{ant}$<br>TIME_CRRCTION_REF = ASSUMED REFERENCE BS-TO-MS PROPOGATION DELAY<br>TIME_CORRECTION = ASSUMED BS-TO-MS PROPAGATION DELAY |

FIG. 4

| MS REQUEST | PDE RESPONSE | NOTES |
|---|---|---|
| REQUEST GPS ALMANAC | PROVIDE GPS ALMANAC | $N_{resp} = 1$<br>WEEK_NUM = $WIN$<br>TOA = $T_{oa}$ |
| REQUEST GPS EPHEMERIS | PROVIDE GPS EPHEMERIS | $N_{resp} = 1$<br>AP_PAR_INCL = '1' |
| REQUEST GPS NAVIGATION MESSAGE BITS | PROVIDE GPS NAVIGATION MESSAGE BITS | $N_{resp} = T_{test}/30$<br>START OF BITS IS NEXT FRAME BOUNDARY FOLLOWING $T_{req}$<br>(NO NAVIGATION MESSAGE UPLOAD DURING THE SIMULATION)<br>SUBF_4_5_INCL = '1' |
| REQUEST LOCATION RESPONSE | PROVIDE LOCATION RESPONSE | $N_{resp} = 1$<br>TIME_REF_CDMA = $T_{req}$<br>LAT = $LAT_{MS}$<br>LONG = $LONG_{MS}$<br>LOC_UNCRTNTY_ANG = '1111'<br>LOC_UNCRTNTY_A = '10000'<br>LOC_UNCRTNTY_P = '10000'<br>FIX_TYPE = '1'<br>VELOCITY_INCL = '1'<br>VELOCITY_HOR = $SPEEDhor_{MS}$<br>HEADING = $HEADING_{MS}$<br>VELOCITY_VER = $SPEEDvert_{MS}$<br>CLOCK_INCL = '0'<br>CLOCK_BIAS = omit<br>CLOCK_DRIFT = omit<br>HEIGHT_INCL = '1'<br>HEIGHT = $HEIGHT_{MS}$<br>LOC_UNCRTNTY_V = '10000' |
| REQUEST GPS ALMANAC CORRECTION | PROVIDE GPS ALMANAC CORRECTION | $N_{resp} = T_{test}/1.28$<br>REF_TIME = ($\lceil T_{req}/1.28 \rceil$ mod 250<br>TOA = $T_{oa}$<br>WEEK_NUM = $WIN$<br>DELTA_XYZ_INCL = '1'<br>DELTA_CLOCK_INCL = '1' |
| REQUEST GPS SATELLITE HEALTH INFORMATION | PROVIDE GPS SATELLITE HEALTH INFORMATION | $N_{resp} = 1$<br>BAD_SV_PRESENT = '0' |

FIG. 4 (CONT.)

GPS TEST SCENARIOS FOR AN MS WITH NO POSITION CALCULATION CAPABILITY

| | 8 SATELLITES WITH HIGH SNR | 2 SATELLITES WITH HIGH SNR, 2 SATELLITES WITH LOW SNR | 4 SATELLITES WITH LOW SNR |
|---|---|---|---|
| STATIONARY | X | X | X |
| MOVING, MOBILE ON A CIRCULAR TRAJECTORY IN A PLANE TILTED BY 45° FROM HORIZONTAL, CENTERED AT THE BS, 30 m/s, 1 km RADIUS | X | | |

FIG. 7

GPS TEST SCENARIOS FOR AN MS WITH POSITION CALCULATION CAPABILITY

| | 8 SATELLITES WITH HIGH SNR | 2 SATELLITES WITH HIGH SNR, 2 SATELLITES WITH LOW SNR | 4 SATELLITES WITH LOW SNR | 3 SATELLITES WITH HIGH SNR |
|---|---|---|---|---|
| STATIONARY, HDOP =2.7 | X | X | X | X |
| MOVING, MOBILE ON A CIRCULAR TRAJECTORY IN A PLANE TILTED BY 45° FROM HORIZONTAL, CENTERED AT THE BS, 30 m/s, 1 km RADIUS, HDOP =2.7 | X | | | |
| STATIONARY, 600m MULTIPATH ON ONE SATELLITE SIGNAL HDOP =2.7 | X | | | |

FIG. 8

METHOD AND APPARATUS FOR TESTING ASSISTED POSITION LOCATION CAPABLE DEVICES

BACKGROUND OF THE INVENTION

1. Field of the Invention

The invention relates to testing assisted position location capable devices. In particular, the invention relates to a position determination entity simulator used in testing assisted position location capable devices.

2. Description of the Related Art

Recently there has been a great deal of interest in determining the location of mobile devices. One area that is of particular interest is the ability to determine the location of cellular phone users in certain circumstances. For example, the Federal Communications Commission (FCC) of the U.S.A. has mandated that the location of a cellular telephone user be determined automatically when the user dials 911. In addition to the FCC mandate, it is envisioned that other applications that can take advantage of knowing a users' location will be developed.

Various techniques have been used to determine the location of a mobile unit. For example, the Global Positioning System (GPS) is a satellite system that provides users equipped with a GPS receiver the ability to determine their location anywhere in the world. A GPS receiver normally determines its location by measuring the relative times of arrival of signals transmitted simultaneously from multiple GPS satellites.

Each GPS satellite transmits a microwave carrier signal that is "spread" by a repeating pseudo random noise (PRN) code. The PRN code of each satellite is unique to that satellite, and all PRN codes repeat with the same duration. In addition, the spreading of the carrier signal used by all GPS satellites is synchronized to begin at the same time, corresponding to GPS time. The microwave carrier signal is also modulated by a 50 Hz signal that contains data describing the satellite orbits, clock corrections, and other system parameters. The GPS satellite positioning data, as well as data on clock timing, is commonly referred to as "ephemeris" data.

Typically, a GPS receiver is able to produce, or has stored in memory, replicas of PRN codes used by the GPS satellites. The receiver shifts the PRN replica in time until there is correlation with the PRN code transmitted by the satellite and received at the GPS receiver. The offset in time corresponding to when there is a correlation represents the time of arrival (TOA) of the satellite PRN at the receiver. The TOA is proportional to the distance between the satellite and the receiver, offset by any difference between the receiver clock and GPS time. The TOA is commonly referred to as the pseudo-range. To be able to solve for the receiver location, the GPS receiver measures the pseudo-ranges to multiple satellites (typically four) to solve for x, y, and z position and to correct timing errors between the receiver clock and GPS time. In addition to the pseudo-range measurements, the receiver demodulates the emphemeris data to allow estimation of the location of the satellites when a pseudo-range measurement is made. Knowing the location of the satellites and the relative range to each satellite allows the receiver location to be estimated through a trilateration process.

The process of searching for and acquiring GPS signals, reading the ephemeris data for a multiplicity of satellites and estimating the location of the receiver from this data is time consuming, often requiring several minutes. In many cases, this lengthy processing time is unacceptable and, furthermore, greatly limits battery life in micro-miniaturized portable applications.

Several techniques have been attempted to reduce the time needed to acquire the GPS data used in location estimation. One such technique that has been developed by the wireless communication industry is the TIA/EIA IS-801-1 standard entitled "Position Determination Service Standards for Dual Mode Spread Spectrum Systems", incorporated herein in its entirety. The IS-801-1 standard includes definitions for messages that are communicated between a mobile unit and a network infrastructure, such as a cellular network, to reduce the time needed to acquire the GPS data. The mobile unit may comprise, for example, a GPS-enabled cellular telephone. The network infrastructure may include a Position Determination Entity (PDE) that assists the mobile unit acquiring the GPS data. For example, when it is desired to determine the location of the mobile unit, the PDE may communicate assistance data to the remote unit to improve the mobile unit's acquisition of the GPS data. Such assistance data may include, for example, the PRN code of the GPS satellites that are most likely to be in the view of the mobile unit, Doppler information, including Doppler search window size, and PRN code phase search window.

Another well-known position location technique is Advanced Forward Link Trilateration (AFLT). The AFLT technique is based on measuring time-of-arrival differences between terrestrial base station signals. In the case of a CDMA wireless network, these measurements are called pilot phase measurements. Whenever the mobile device is able to detect signals from three different base station locations, one of which is likely to be the serving base station, the mobile device's position can be determined.

It is possible that at a particular location, the mobile device is neither able to detect signals from at least four GPS satellites nor able to detect signals from at least three base stations. In this case, neither the GPS nor the AFLT technique alone would give a position solution. A third technique, commonly referred to as a "Hybrid" technique, combines the GPS and AFLT measurements. The hybrid technique may still give a position solution even in the case in which less the required number of satellites are available. When the mobile device communicates with a GPS synchronous cellular network, such as an IS-95 or IS-2000 standards compliant CDMA network, the Hybrid technique has the additional advantage of further reducing the required minimum number of measurements. Both the AFLT and Hybrid techniques are supported by the IS-801-1 standard, which defines applicable assistance messages to be sent by the PDE to the mobile device.

Presently, various vendors are developing PDEs to comply with the IS-801-1 standard. However, even if two PDEs from different vendors both meet the IS-801-1 standard, the assistance data provide by the two PDEs may be different. Differences in the assistance data provided to a mobile unit may affect the performance of the mobile unit in acquiring GPS data. For example, it may take longer for a mobile unit to acquire the GPS data with the assistance data provided by one vendor's PDE than with another vendor's PDE. Most mobile units, however, are optimized for operation with a specific vendor's PDE. The published performance specifications of a mobile unit may relate to operation with the PDE for which the mobile unit has been optimized.

Variations in PDE performance make it difficult to test and compare the performance of various mobile units. For example, if a single vendor produces both PDEs and mobile units, the PDE and mobile units may achieve a satisfactory level of performance together. However, the same PDE or mobile unit may not achieve satisfactory performance when operating with a mobile unit or PDE produced by a different vendor. As it is anticipated that there will be many different manufacturers of PDEs and mobile units, variations in performance when different combinations of PDEs and mobile units interact can reduce the overall effectiveness in estimating the location of the remote unit. This can result in very severe consequences, particularly in an emergency, or 911, situation.

Due to these and other problems, there needs to be a standard technique and apparatus that facilitates testing of mobile unit performance when acquiring GPS data for estimating the mobile unit's location.

SUMMARY OF THE INVENTION

A method and apparatus for testing assisted position location capable devices are provided. One aspect is providing a position determination entity (PDE) simulator that is in communication with a base station simulator. The base station simulator simulates one or more base stations. The disclosed method includes connecting an assisted position location capable device under test to the base station simulator, a global positioning system (GPS) simulator, and initiating a test sequence wherein the device under test receives a set of predetermined GPS signals. At a desired time, the device under test (DUT) requests assistance data from the base station simulator and the base station simulator requests assistance data from the PDE simulator, wherein the PDE simulator provides data that is independent of the GPS simulator data to the base station, and the base station transfers the PDE data to the DUT. The PDE data may be a set of predetermined responses to any one of a plurality of requests.

Another aspect of a method for testing assisted position location capable devices includes (1) providing a position determination entity (PDE) simulator that is in communication with a base station simulator simulating one or more base stations, (2) connecting an assisted position location capable device under test to the base station simulator and a global positioning system (GPS) simulator, and (3) initiating a test sequence. During the test sequence, the PDE simulator provides assistance data and a request for the device under test to make pseudo-range measurements or pilot phase measurements or both, and wherein the device under test receives the assistance data and the request and, using the assistance data, makes pseudo-range measurements or pilot phase measurements or both and provides the measurement results to the base station simulator. The PDE data may be a set of predetermined responses indexed by elapsed test time.

Another aspect of testing assisted position location capable devices in accordance with the invention includes providing a position determination entity (PDE) simulator that is in communication with a base station simulator simulating one or more base stations and connecting an assisted position location capable device under test to the base station simulator and a global positioning system (GPS) simulator and initiating a test sequence. In the test sequence, the PDE simulator provides assistance data and a request for the device under test to make a location measurement, and the device under test receives the assistance data and the request and, using the assistance data, makes a location measurement and provides the location measurement to the base station simulator. The PDE data may be a set of predetermined responses indexed by elapsed test time.

A position determination entity (PDE) simulator constructed in accordance with the invention includes a controller configured to receive assistance requests and to output assistance responses, and operates with a database populated with predetermined assistance responses corresponding to a set of assistance requests. An appropriate response is selected from the database in accordance with the received type of assistance request and the elapsed test duration. The assistance responses may correspond to GPS or AFLT data.

BRIEF DESCRIPTION OF THE DRAWINGS

FIG. 4 is a table listing various MS requests and the corresponding PDE simulator response for the system of FIG. 2.

FIG. 7 is a table that lists test scenarios of the FIG. 2 system for a mobile station with no position calculation capability.

FIG. 8 is a table that lists test scenarios of the FIG. 2 system for a mobile station with position calculation capability.

DETAILED DESCRIPTION

Figure 1:
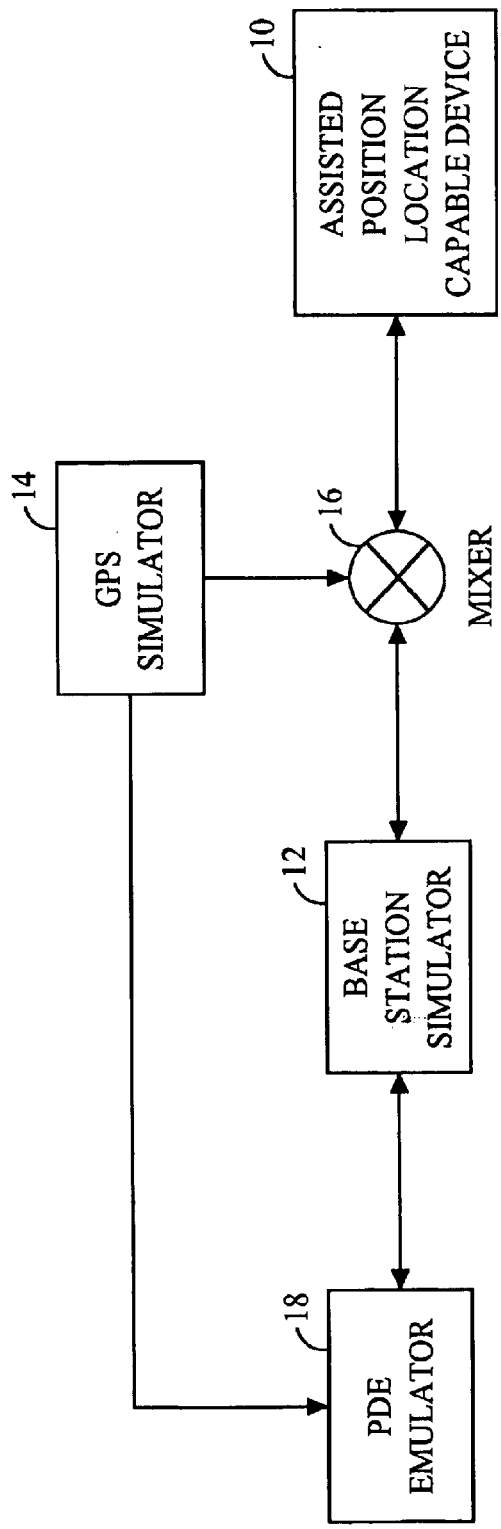
FIG. 1 is a block diagram illustrating a conventional setup for testing assisted position location capable devices.

FIG. 1 is a block diagram illustrating a conventional setup for testing assisted position location capable devices that are intended for operation in a telecommunications network. As shown in FIG. 1, the assisted position location capable device under test 10 communicates with a base station simulator 12, which may simulate one or more base stations, and a GPS simulator 14 via a mixer 16. The base station simulator 12 is also in communication with a PDE emulator 18. The PDE emulator 18 also receives signals from the GPS simulator 14. In keeping with companion emulator principles, the PDE emulator 18 imitates the operation of an operational PDE in terms of its inputs and outputs. Thus, the PDE emulator (and also the base station simulator) may comprise fully operational devices.

In a typical test sequence the device under test 10 will request assistance data from the base station simulator 12. The base station simulator 12 will receive the assistance request from the device under test 10, and will send a request for assistance data to the PDE emulator 18. The PDE emulator 18, which has been receiving the same GPS signals form the GPS simulator 14 as the device under test 10, is configured to provide assistance data to be used by the device under test 10.

The PDE emulator 18 communicates the assistance data to the base station simulator 12 where it is formatted and transmitted to the device under test 10. The device under test, which has been receiving GPS signals from the GPS simulator 14, will use the assistance data and acquire the pseudo-range data from the GPS signal. The device under test 10 will then transmit the pseudo-range data to the base station simulator 12. One method of evaluating the performance of the device under test 10, as it relates to position location, is to determine the accuracy of the pseudo-range measurements, and the length of time it took the device under test 10 to acquire and make the measurements.

Figure 2:
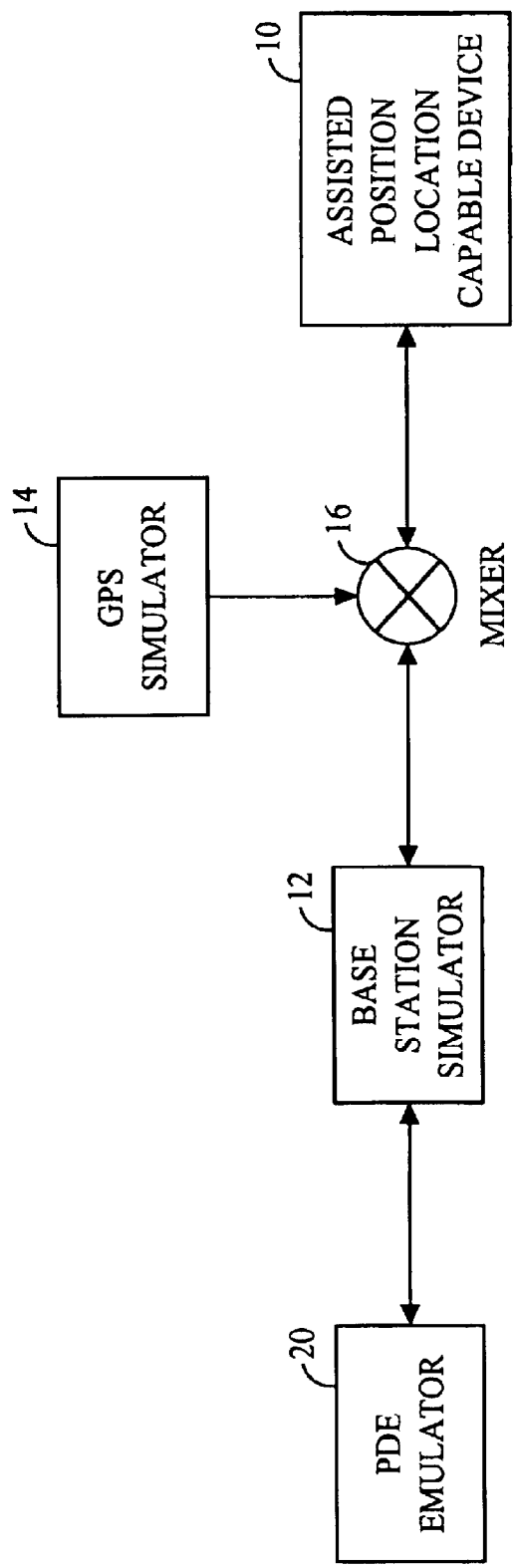
FIG. 2 is a block diagram illustrating an improved setup for testing assisted position location capable devices, constructed in accordance with the present invention.

FIG. 2 is a block diagram illustrating an improved setup constructed in accordance with the present invention for testing assisted position location capable devices. As shown in FIG. 2, the assisted position location capable device under test 10 communicates with the base station simulator 12, which may simulate one or more base stations and the GPS simulator 14 via the mixer 16. The base station simulator 12 is also in communication with a PDE simulator 20 constructed in accordance with the present invention. The PDE simulator 20 is not in communication with the GPS simulator 14 except for possibly receiving a timing signal, for example a 1 PPS (pulse per second) signal, from it. When the base simulator 12 and GPS simulator 14 are time-synchronized, the timing signal is obtained from the base station simulator instead of the GPS simulator. As the timing accuracy requirements for the PDE simulator 20 are not strict, the timing signal may be omitted altogether, and an internal clock in the PDE simulator be used instead.

In a typical test sequence both the GPS simulator 14 and the PDE simulator 20 are started at approximately the same time. When an internal clock is used in the PDE simulator instead of obtaining system time from the other test equipment, as explained above, then the start of the PDE simulator clock at the approximate start time must be triggered externally. During the test, when the device under test 10 requests assistance data from the base station simulator 12, the base station simulator 12 will receive the assistance request from the device under test 10 and send a request for assistance data to the PDE simulator 20. The PDE simulator will use the specific request and the elapsed test time to produce a response. As will be explained in greater detail below, the PDE simulator 20 includes a database that has fields corresponding to a predetermined response for various requests that can be made by the device under test 10. The elapsed test time and the type of request received from the device under test 10 are used to select the appropriate PDE simulator response. The PDE simulator 20 response can be predetermined because the GPS simulator output begins at a known GPS system time at the beginning of each test sequence, thereby determining the GPS satellite positions for the test sequence. Because the GPS simulator 14 and PDE simulator 20 both are started at approximately the same GPS system time, the approximate GPS simulator output at any time after the start of the test is known and an appropriate PDE response can be predetermined. Then during the test, the elapsed test time is used by the PDE simulator 20 to select the PDE response corresponding to elapsed test time and the type of request made by the unit under test.

As will be explained in detail later, it may be desirable to make a jump in system time and change reference location or other reference data between measurements during the test process. As the PDE emulator (18 in FIG. 1) has to obtain all reference data from the observed signal of the GPS simulator (14 in FIG. 1), for example by way of utilizing a GPS receiver, this may be considered impractical because of the long time the re-synchronization typically takes. On the other hand, since the PDE simulator (20 in FIG. 2) does not obtain reference data from the observed GPS simulator signal, the time delay caused by re-synchronizing the PDE simulator can be avoided, as long as the reference data is changed in a predetermined fashion, consistent with the predetermined PDE response database explained above.

Figure 3:
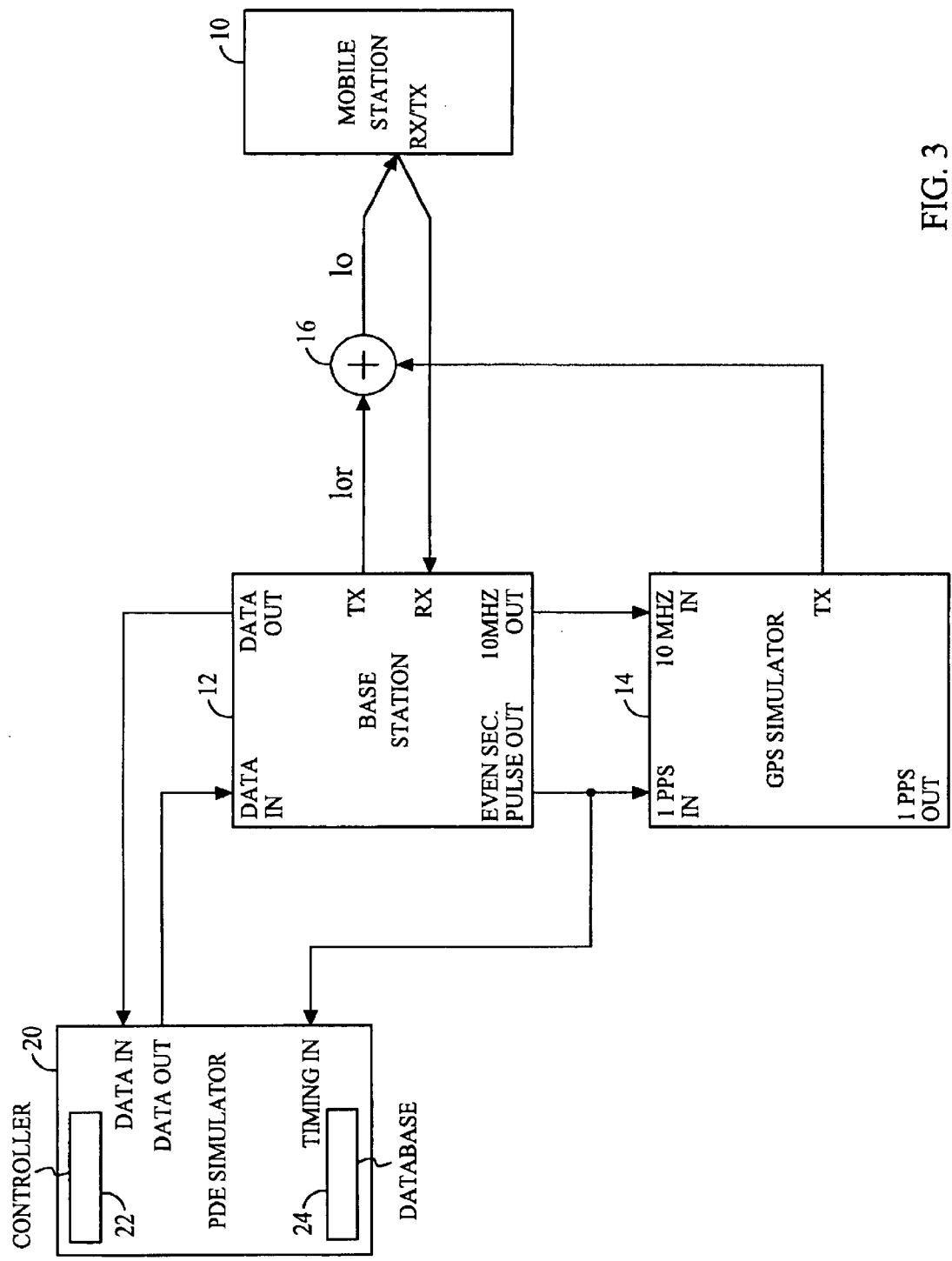
FIG. 3 is a block diagram of a test set up illustrating additional detail of an improved setup, constructed in accordance with the present invention.

FIG. 3 is a block diagram of a test set up illustrating additional detail of an improved setup for testing assisted position location capable devices constructed in accordance with the present invention. As illustrated in FIG. 3, the unit under test 10, also referred to as a mobile station (MS), receives signals simultaneously from the base station (BS) simulator 12, which may simulate one or more base stations, and the GPS simulator 14. If the MS 10 has a single RF input, then the two simulator signals will be combined using a power combiner, or mixer 16 with a known attenuation.

The system of FIG. 2 preferably operates in accordance with the IS-801-1 standard promulgated by the telecommunications industry for use with cellular telephone CDMA networks. Typically, IS-801-1 data traffic is carried by data burst messages that are transparent to the BS simulator. These burst messages are provided by the PDE simulator 20. However, if a BS simulator with data burst capability is not available, then an alternate method of messaging between the MS 10 and the PDE simulator 20 may be permissible. For example, TCP/IP packets may be sent if the base station simulator has data service option capabilities, or the MS can be connected to the PDE simulator directly through the MS's data port.

In one embodiment, the PDE simulator may comprise application software executing on a personal computer (PC) or other low cost computing device capable of storing and retrieving assist data as described in further detail below. Thus, the PC acts as a controller of the PDE simulator and utilizes stored data comprising a database of the PC. In another embodiment, the PDE simulator may include a controller 22 and a database 24, used to store and retrieve assist data.

In general, time and frequency synchronization between the BS simulator 12 and the GPS simulator 14 must be maintained, because many MS implementations acquire GPS system time from the CDMA network. For example, in a system based on IS-95, IS-2000, or WCDMA, the BS receives GPS system time from a GPS receiver and synchronizes its CDMA timing to GPS system time. An MS receiving the CDMA signal from the BS is able to extract the GPS system time from the received CDMA signal.

In the test setup shown in FIG. 3, time and frequency synchronization may be achieved via two separate connections. In one connection, for frequency synchronization, a standard 10 MHz signal will be used on both the BS and the GPS simulators. The direction of the signal should be set so that the clock with higher precision is configured as the source. FIG. 3 shows the BS simulator as the clock source. In another connection, for system time synchronization, a standard 1 pulse per second (PPS) signal from the base station simulator may be used. Both the BS and the GPS simulators are preset to start at the same predetermined reference time, for example, at the occurrence of the first strobe pulse.

In general, to obtain adequate frequency accuracy, the standard capabilities of the GPS simulator 14 should suffice. However, obtaining adequate time accuracy is usually more difficult. For example, the 1 PPS pulses are not typically sampled at a rate sufficient to meet the timing accuracies needed. A possible solution for this is to independently measure the timing offset. Once the initial time synchronization has taken place between the BS and GPS simulators, the frequency lock can be used to maintain a constant time offset between the BS and the GPS simulators. Thus, recording a single accurate time offset measurement per test run is sufficient.

EXAMPLES OF TYPICAL TEST SETTINGS

The following examples of levels for various signals are provided as illustrations of possible levels that can be used. It will be obvious to those skilled in the art that other levels may also be used. For example, frequency deviation from nominal for both the BS and the PDE simulators will usually be less than about ±0.02 ppm (parts per million). Frequency drift for both the BS and the GPS simulators will usually be less than about ±0.06 Hz/s. Phase offset between the BS and the GPS simulator carriers (after frequency division to match the lower of the two frequencies) will be constant within about ±0.2 radians throughout the test. Timing offset between the BS and the GPS simulators (i.e. the offset between CDMA and GPS system time) will generally be less than about ±10 μs. The timing offset between the BS and the GPS simulators will typically be measured with an accuracy of better than about ±10 ns.

To improve testing, the propagation delay (for example, delay caused by cables and other hardware elements) should be approximately the same between the BS simulator 12 and the MS 10 and between the GPS simulator 14 and the MS 10. Typically, using approximately the same cable length will satisfy this requirement. The propagation delay between the BS and the GPS simulators to the MS could also be corrected by adjusting the time offset between the BS and the GPS simulators so as to include the propagation delay offset.

The BS simulator provides a signal for example, with a level of about −56 dBm/BW, with Pilot and Traffic $E_c/I_{or}$ set at about −7 dB and about −7.3 dB, respectively, where $E_c$ is the signal energy contained in one spreading sequence chip, while $I_{or}$ is the total power of the BS simulator transmitter. In one embodiment, no channel models will be used and no hand-off scenarios will be simulated. In other embodiments, channel models may be used and hand-off scenarios may be simulated, either in combination with each other or individually.

The BS simulator signal levels are referenced to the MS antenna connector input. During the test, the actual BS simulator settings may be adjusted to account for all cable, connector and combiner losses, so that the nominal values at the MS antenna input can be maintained. Typically, allowable power level error is less than about 2 dB.

In general, the GPS simulator 14 will provide the following signals: Signals representing a number of GPS satellites, with independent trajectories, with a phase error representing no more than about 2 meters in pseudo-range error. The GPS simulator 14 will also provide satellite positions and timing based on Ephemeris data input, where all Ephemeris parameter fields are populated. The signal phase is usually set dynamically based on the satellite and user positions, and can include added offset derived from ionospheric, tropospheric and group delay models. The GPS simulator 14 also can be set to simulate the user position as stationary or in motion, for example, along a circular trajectory. In addition, the GPS simulator 14 modulates the satellite signal with navigation bits using a specified bit stream in a manner that is consistent with the simulated GPS system time and the Ephemeris and other navigation data. Also, the GPS simulator sets the satellite power levels to desired levels. The power levels are usually referenced to the MS antenna connector input. During the test, the actual GPS simulator settings may be adjusted to account for cable, connector and combiner losses, so that the desired nominal values at the MS antenna input can be maintained. Typically, the maximum allowable power level error is about 2 dB.

Setting the GPS constellation, system time, and reference location, is generally done using a 'golden reference' Ephemeris and Almanac, and the 'golden reference' is usually used in all measurements. The chosen GPS constellation at the selected reference time and location should make it possible to select satellite subsets containing a desired number of satellites constituting a desired Horizontal Dilution of Position (HDOP) value. And in general, all data fields in the Ephemeris and the Almanac should be populated with non-zero values that can be considered typical.

Generally, measurement will be started at a predetermined reference time, and a pre-selected reference location will be programmed into the GPS simulator. The reference time is chosen in accordance with the time of applicability of the chosen Ephemeris. Typically, the reference time should be chosen after the first Week Number (WIN) rollover (i.e. past October 1999).

PDE Simulator

In general, before the availability of the present invention, a sophisticated PDE emulator would be needed to test an MS, and the complexity of such a PDE emulator would match that of a fully functional PDE. One possibility is to use a commercially available PDE for the MS testing. A drawback to this approach is that any flaw or quirk in the PDE software could alter the MS test results from MS to MS. Also, because GPS assistance is time dependent, the uniformity of the test responses of the PDE through different runs with different MS's can't be assured. A technique described below with a PDE emulator as described above helps to overcome these problems. The technique uses the PDE simulator of the present invention that provides a consistent device for testing and decouples the MS performance from the performance of the PDE simulator. One aspect of the technique is that responses of the PDE simulator 20 are predetermined and kept the same over all runs of the tests.

The PDE simulator 20 constructed in accordance with the invention recognizes requests from the MS under test and responds to them. Typically, the PDE simulator 20 will parse the received messages, extract the field that identifies the type of request, such as the REQ_TYPE field in IS-801-1, and will determine the time of arrival of the messages. The PDE simulator 20 outputs a response based on the type of request made and the time of arrival of the request. The PDE simulator uses values for the type of request and the time of arrival of the request as indices into an array, or database, that stores all the possible PDE simulator responses. Thus, the data field values in the responses are not calculated real-time by the PDE simulator, as would be done by a PDE emulator. Instead, the responses are predetermined and loaded into the array from a database.

Using time as an index limits the duration that the PDE simulator can respond to requests. For example, if the PDE simulator 20 responds to requests from the MS to provide GPS acquisition assistance messages with 1.28 s increments (1.28 s is the resolution of the TIME_OF_APP field of the Provide GPS Acquisition Assistance Message, defined in IS-801-1), corresponding to the time of arrival of the request, then a maximum test duration of 40 minutes could be supported by storing 40*60/1.28=1875 Provide GPS Acquisition Assistance messages.

When a requested GPS acquisition assistance message arrives from the MS, the PDE simulator 20 responds with a message that has the smallest time of arrival value that is greater than the time of arrival index plus a predetermined offset. The value of the predetermined offset allows the MS to receive the message from the PDE simulator before the values that are in the PDE message are valid. In other words, the values in the PDE message sent to the MS inform the MS of the setting that the MS should assume at some time in the future. The PDE sends values that are valid at some future time to allow for unknown delays that are present between the transmission of the PDE message and the time that the MS can receive and process the information contained in the message. Similar time indexing algorithms are used by the PDE simulator when the PDE simulator receives requests from the MS for other types of messages, for example, for requests for GPS Location Assistance, GPS Sensitivity Assistance, GPS Navigation Message Bits, and GPS Almanac Correction messages.

PDE Simulator Responses

The responses by the PDE simulator 20 to any MS assistance request message are determined by calculations, done off line, that use selected Almanac and Ephemeris data sets corresponding to selected time and location references.

In an IS-801-1 system, some of the message types in the MS requests contain parameter records. These parameter records list optional data fields the MS expects to be included in the responses. A real PDE, or a PDE emulator, would respond to the MS requests based on the values it sees in the request parameter record. In accordance with the present invention, the responses of the PDE simulator may be made independent of the request parameter records, thereby simplifying the PDE simulator. Note that there may be exceptions to these types of responses, for example, when the request describes a preferred coordinate type selecting one of the two Provide GPS Location Assistance messages. This technique may result in responses from the PDE simulator being different than a corresponding response from an actual PDE or a PDE emulator. For example, the PDE simulator may not be fully IS-801-1 compliant. Not being fully compliant is not expected to be a problem because most of the deviation from IS-801-1 is against optional, or 'should', requirements and therefore compliance is not required. In addition, the test scenario may be quite realistic, because in actual use the MS could receive unsolicited responses from the PDE that were sent before the corresponding request was received by the PDE. In this situation, the request parameters and the response may not match. Thus, this messaging mismatch may be more effective in testing the robustness of the MS's parsing algorithm.

In addition, because the PDE simulator response is the same irrespective of the requested data fields, all optional data fields are typically included in the response. Because all optional fields are typically included in the response, it can be ensured that the MS received all information it requested. In this way, the MS performance should not be compromised because an optional field requested by the MS was not provided by the PDE simulator.

In one embodiment, the PDE simulator permits an exception to including all optional fields in a response. In this embodiment, the field CLOCK_INCL in the Provide Location Response message is set to zero. In the case of a PDE emulator, the clock parameters would be computed based on the pseudo-range measurements returned by the MS, and the computed values would be included in the Provide Location Response message, and CLOCK_INCL would be set to one. In the case of a PDE simulator, however, the clock parameters are not computed, and sending back incorrect clock data could hinder the MS performance. However, because the requirement for the BS regarding CLOCK_INCL, in IS-801-1, is 'should', this setting is acceptable.

FIG. 4 is a table 400 listing various MS requests and the corresponding PDE simulator response for the preferred embodiment. The table 400 in FIG. 4 has three columns, one that contains various MS requests 402, a second column that contains the PDE simulator response 404 to the corresponding MS request, and a third column that has examples of values 406 that are in some of the various fields of the response.

The following notation is used in FIG. 4:

$T_{test}$=Maximal time length of the test run in units of 1 second (3600 s suggested)

$N_{resp}$=Number of stored response messages per test $PN_{ref}$=Reference PN set at the BS simulator in units of 64 chips $T_{req}$=System time at the PDE when the request was received, in units of 1 second $LAT_{ref}$, $LONG_{ref}$, $HEIGHT_{ref}$=Coordinates of the reference location, same as serving BS horizontal location $OFFSET_{ant}$=Altitude offset between serving BS antenna and reference location $LAT_{MS}$, $LONG_{MS}$, $HEIGHT_{MS}$=Coordinates of the MS determined by the GPS simulator's vehicular model $SPEEDhor_{MS}$, $HEADING_{MS}$, $SPEEDvert_{MS}$=Motion parameters of the MS set by the GPS simulator's vehicular model WlN=Week number of reference time $T_{oa}$=Time of Almanac in the reference Almanac Note that the MS location ($LAT_{MS}$, $LONG_{MS}$ and $HEIGHT_{MS}$) and MS velocity ($SPEEDhor_{MS}$, $HEADING_{MS}$ and $SPEEDVert_{MS}$) values provided by the PDE simulator may be intentionally offset by values simulating the location and velocity determination error. Also note that any portion of the BS-to-MS propagation delay that is assumed by the geometrical layout described in the test scenario but is not actually simulated by the test equipment or attached delay lines, should be included in the TIME_CRRCTION_REF and TIME_CORRECTION fields of the Provide Base Station Almanac message sent by the PDE simulator.

In one embodiment, the PDE simulator divides response messages into parts in order to keep the size of the forward link (FL) PDDMS (Position Determination Data Messages) below a desired number of bytes, for example, below about 200 bytes.

To simulate sharing the CDMA code channel with E911 voice traffic, the available bandwidth for FL position location messaging may be constrained. The PDE simulator may queue outgoing messages and only allow traffic at a reduced rate, for example a rate of 20% of the full voice channel rate. For the example of only allowing traffic at a rate of 20%, the available FL position location messaging capacity may be approximately 1720 bps.

Call Flows to be Used in the Tests

In the IS-801-1 standard, there are no mandatory call flows defined. Typically, messages are exchanged based on a request-response protocol, but the existence of unsolicited responses allows for deviation from this at any time. The total number of possible call flows runs in the hundreds, which makes exhaustive testing difficult. Furthermore, a particular call flow cannot be enforced unilaterally from the BS side.

For the reasons above, no explicit call flows will be prescribed for testing in accordance with the present invention. The test will always be started with a PDDM from the PDE simulator, that is, all tests will be mobile terminated (MT). Mobile originated (MO) tests can also be performed if the initiation of the position location session by the MS can be invoked by external means. The PDE simulator will send the messages and it will also respond to any MS requests received during the position location session.

In the following, example call flows are given for MO GPS tests. Note that call flows for AFLT or Hybrid tests can be designed in a similar fashion, utilizing the applicable position location messages defined in IS-801-1.

Figure 5:
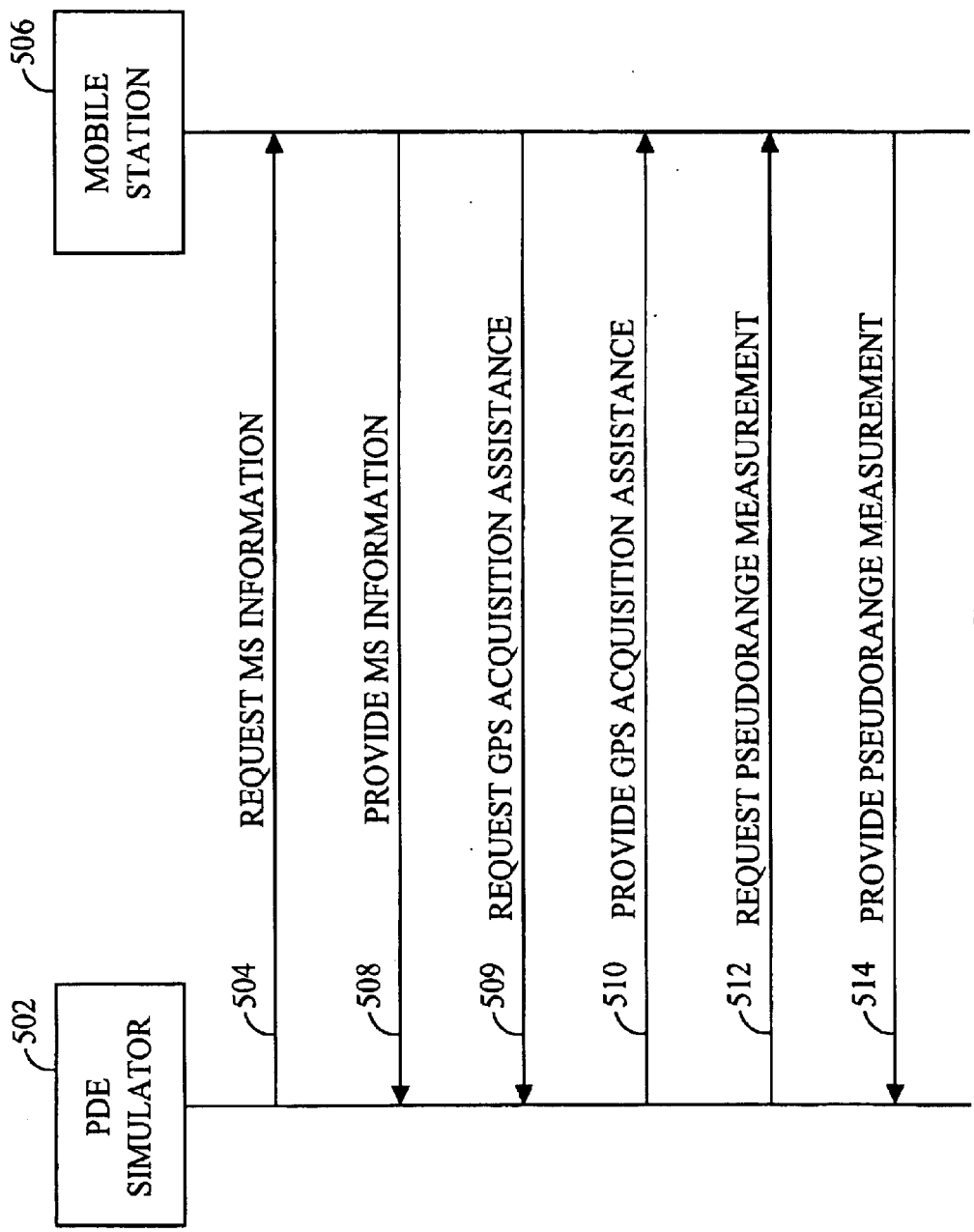
FIG. 5 is a call flow diagram for a test where the PDE simulator of FIG. 2 initiates a pseudo-range measurement test.

FIG. 5 is a call flow diagram for a test where the PDE simulator initiates a pseudo-range measurement test. In this example, the MS is not capable of calculating a location. As shown in FIG. 5, the PDE simulator 502 sends a Requests MS Information message 504. The MS 506 receives the request and responds with sending a Provide MS Information message 508. The MS 506 then sends a Request GPS Acquisition Assistance message 509. The PDE simulator 502 receives the request and responds with sending a Provide GPS Acquisition Assistance message 510. The MS 506 receives the Provide GPS Acquisition Assistance message 510 and parses it so as to use the message values in a pseudo-range measurement. The PDE simulator 502 then sends a Request Pseudorange Measurement message 512. The MS 506 receives the Request Pseudorange Measurement message 512 and acts on it. In particular, the MS 506, after completing the pseudo-range measurement, sends a Provide Pseudorange Measurement message 514 to the PDE simulator.

Figure 6:
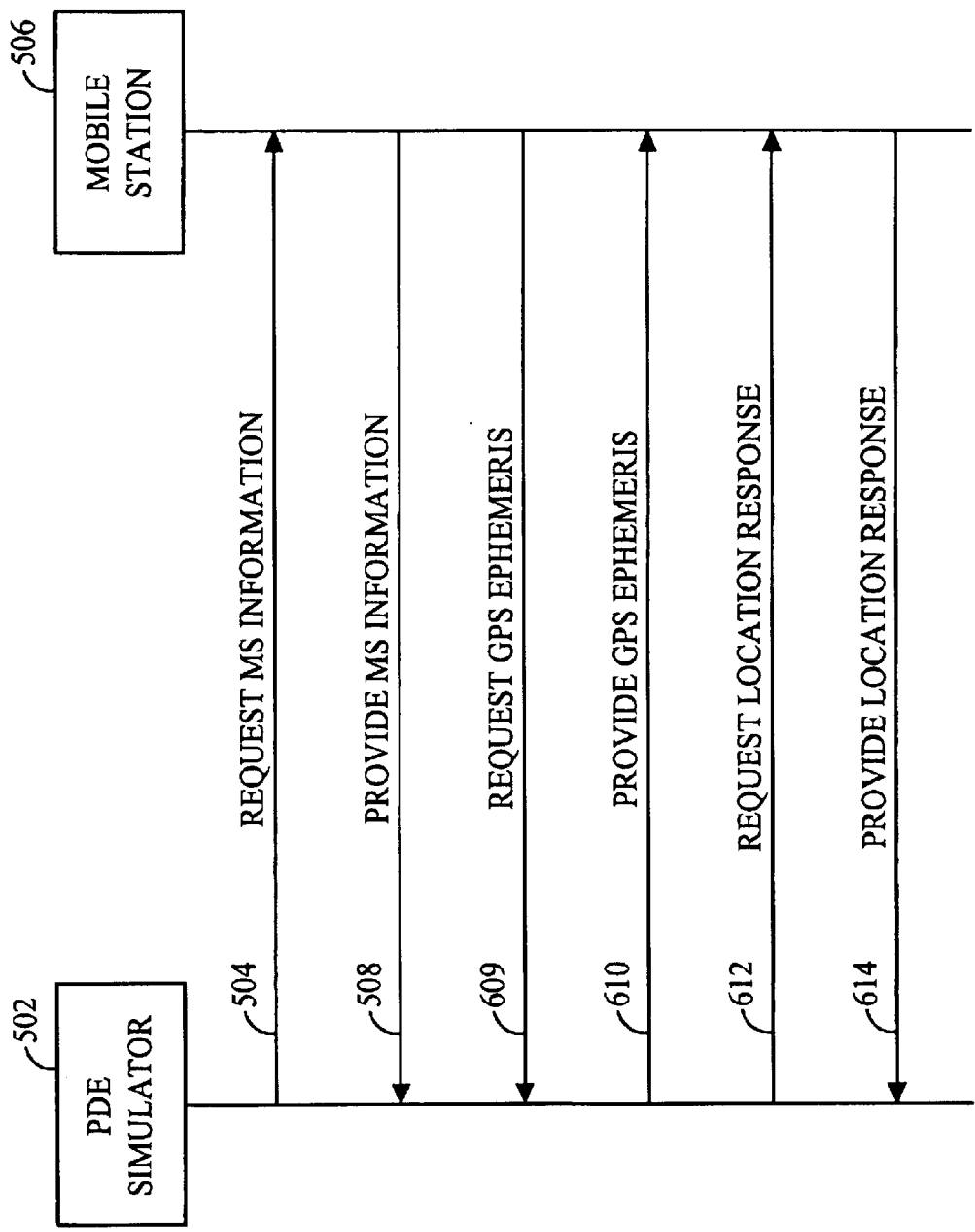
FIG. 6 is a call flow diagram for a test where the PDE simulator FIG. 2 initiates a position location test.

FIG. 6 is a call flow diagram for a test where the PDE simulator initiates a position location test, when the MS is capable of calculating a location. As shown in FIG. 6, the PDE simulator 502 sends a Requests MS Information message 504. The MS 506 receives the request and responds by sending a Provide MS Information message 508. The MS 506 then sends a Request GPS Ephemeris message 609. The PDE simulator 502 receives the request and responds by sending a Provide GPS Ephemeris message 610. The MS 506 receives the Provide GPS Ephemeris message 610 and parses it so as to use the message values in a location determination. The PDE simulator 502 then sends a Request Location Response message 612. The MS 506 receives the Request Location Response 612 and acts on it to determine location. The MS 506, after completing the location determination, provides the determined location in form of a Provide Location Response message 614 to the PDE.

For the Request Pseudorange Measurement 512 and Request Location Response 612 messages, the message field PREF_RESP_QUAL will generally be set to '010'.

Repeated Measurements

Typically, minimum performance tests require collecting statistics over several test runs. There are several different techniques of obtaining repeated measurement results. One technique is to reset the complete test set up between measurements. This technique allows taking every measurement at the same system time, simplifying the generation of PDE response messages. However, there are several drawbacks to this technique. One such drawback is the logistical difficulty it presents in that the entire test sequence must be restarted for each measurement. Another drawback is the lack of diversity created in the measurement environment. One approach to solve both these drawbacks is to make a periodic measurement. The periodic measurement would mean resetting, or synchronizing the BS and the GPS simulators and bringing up a new call, only at the beginning of the test, and then putting the MS in a periodic measurement mode.

A problem associated with this periodic measurement approach is that it simulates a scenario that is not equivalent to taking measurements in individual independent E911 sessions. An illustration of this is the case when the MS uses the previous measurement result to obtain or improve the current measurement result, for example, by filtering or by performing code phase window propagation. In this case an undesirable bias is created in the MS performance.

A possible solution is to use an individual measurement approach. To introduce more diversity, the test set up can be initialized with different system times for each measurement. It is important to ensure a complete reset of the MS between measurements, which can be accomplished by varying system test times, for example, varying system test times by more than one month between measurements. The variation in system time should adequately test the MS's capability to detect the staleness of the assistance data it may have stored.

Statistical Evaluation

Generally, there are two reasons for requiring repeated measurements in the testing. First, test data that is evaluated is often collected from noisy measurements, thus, it is desirable to employ statistical methods. Secondly, it is desirable that test measurements be taken in the MS under various internal signal conditions, such as positions within the code phase and Doppler windows, C/A auto- and cross-correlations. One technique used to achieve this is to rely on worst-case scenarios to occur based on probabilistic expectations rather than applying conditions specifically geared towards creating those scenarios. One reason for not attempting the latter is that typically those worst case scenarios only occur for short periods of time and usually there is no way to ensure that an MS is taking measurements at exactly those times.

Both these reasons would imply using a minimum number of measurements. There is a notable difference between the nature of those required minimum numbers. If the test data is collected in a noisy environment, the number of measurements can be mathematically derived, and is usually dependent on the required confidence level and on the actual test results. For example, if the collected sample statistics indicate that the MS under test is far exceeding the requirements then the testing can be stopped earlier than it could otherwise. The required number of measurements to achieve sufficient diversity in internal signal conditions is independent of the MS performance but is more difficult to determine.

Based on the above discussion, the number of measurements to be taken may be the larger of a desired number, for example 100 measurements, needed for achieving the required diversity in internal signal conditions, or the number needed for achieving the desired statistical confidence. Determining the number needed for the desired statistical confidence will be discussed below.

To evaluate the collected error statistics, a desired method is chosen. There are a number of methods to choose from, one being to establish a threshold on the error RMS. A problem with this, or similar, methods is that they assume a 'benign' error probability distribution function because they are heavily biased against large errors. It is known that in a GPS or AFLT system, whenever a false alarm occurs, the resulting error will be approximately uniformly distributed over a wide range and thus the error will be an unpredictable, large value. Including these errors in the statistics will almost always decrease the statistical confidence to unacceptably low levels. A technique to overcome this limitation is to set probability limits on large errors. One such method is applying a $\sigma_1$, $\sigma_2$ type evaluation criterion. In this method two values, X and Y, are specified. Then passing the test requires the error to be less than X with at least 67% probability, and less than Y with at least 95% probability.

When trying to establish probability estimates based on a limited number of samples, sound statistical reasoning must be applied. The minimum performance test does not mandate any given method, but it will require that the specified probability limits be met by at least about a 90% confidence level.

An example of an applicable evaluation method is explained as follows. In this example the parameters are: X=50 m, Y=150 m, where X is the $\sigma_1$ error limit and Y is the $\sigma_2$ error limit. The prescribed probabilities are: $p_1$=0.67, $p_2$=0.95 and C=0.9, where C is the required confidence level. After taking n measurements, the error values $e_1,e_2,K,e_n$ are calculated. Then the numbers $N_X$ and $N_Y$ are determined as follows.

$$N_X = \sum_{i=1}^{n} I(e_i > X),$$

$$N_Y = \sum_{i=1}^{n} I(e_i > Y),$$

where I(condition) is the indicator function having value "1" if condition is true, "0" otherwise, i.e. calculate the number of times the error is larger than the threshold. Then the test is satisfied if both the following conditions are met.

$$\frac{\chi^2(1-C, 2 \cdot N_X)}{2} \leq n \cdot (1 - p_1),$$

$$\frac{\chi^2(1-C, 2 \cdot N_Y)}{2} \leq n \cdot (1 - p_2),$$

where $X^2(p,k)$ is the value x such that P(X>x)=p, where X is a k degree of freedom chi-squared distributed random variable.

Other methods that are statistically equivalent are permissible. If multiple return data types are being tested, then the test can be stopped only if the required confidence levels are achieved for all the data types. Again, the number of tests is subject to a minimum, determined by the requirement explained above.

Note that a similar condition on stopping the test when failure can be established with a set confidence level can also be established. For example, a required confidence level, e.g. 95%, can be specified that ensures the MS meets a desired performance level but also makes it possible to reduce the time required for testing. The required confidence level for declaring a failed test is typically set differently from the required confidence level for declaring a successful test.

Repeating tests after a failure may be allowed but in the test report the reason and exact circumstances should be described.

Data Evaluation Methods

Typically, test results may be collected in two reports, as follows. The first report contains the minimum standard report that states whether the MS passed or failed the applicable tests. All relevant data, such as time, date and location of the test, the model and serial number of the test equipment, the exact test setup and the number of measurements carried out, is usually included along with the results.

The second report contains the optional complete performance report and will contain all collected statistics, typically in a form of Cumulative Distribution Functions (CDFs).

Evaluation Methods for an MS without Position Calculation Capability

In the case of an MS with no position calculation capability, the testing may include evaluating the returned Provide Pseudorange Measurement response elements in the case of GPS tests, or the returned Provide Pilot Phase Measurement response elements in the case of AFLT tests.

When collecting the results for a particular measurement, the tester waits until the time period specified by PREF_RESP_QUAL (Preferred Response Quality field in the IS-801-1 Request Pseudorange Measurement message or Request Pilot Phase Measurement message) expires, or all response element parts are received, whichever happens first. All response element parts are received when PART_NUM=TOTAL_PARTS (Part Number and Total Parts fields in the IS-801-1 Provide Pseudorange Measurement message or Provide Pilot Phase Measurement message) is observed in the received MS response. Then the total number of returned pseudo-range records or pilot phase records in all response parts for the given measurement is determined. From this number, the records in which PS_RANGE_RMS_ER (Pseudo-range RMS Error field in the IS-801-1 Provide Pseudorange Measurement message) or RMS_ERR_PHASE (RMS Error Phase field in the IS-801-1 Provide Pilot Phase Measurement message) is set to '111111' will be excluded. Furthermore, all values in such records will be excluded from further evaluation. Note that in the determined number of pseudo-ranges, no satellite can be counted twice, and in the determined number of pilot phases, no pilot can be counted twice.

If the total number of pseudo-ranges or pilot phases for a given measurement is less than a minimum value specified for that test scenario, then that measurement will be declared a failure. This minimum number may be determined based on what is needed for computing a location fix.

The returned values may be included in the statistics even if they pertain to failed measurements; but the number of failed measurements will be separately recorded. In one embodiment, in order to pass the test it has to be established that the measurement failure probability is less than a desired value, $p_f$, or in other words, the yield is greater than $1-p_f$. In one embodiment, the confidence level may be set to be at least about 70%. The relatively low confidence level, of about 70%, reflects the practical limit on the number of measurements. In addition, different $p_f$ values may be specified for different test scenarios.

Minimum GPS Measurement Standard for an MS without Position Calculation Capability It is desirable to test the yield, accuracy and timeliness of the returned pseudo-range measurements. Other returned values are also tested, but the accuracy requirements for those values are generally significantly lower, in recognition of the fact that they may have only an indirect effect on the positioning accuracy. Some of the returned values are described below:

SV_CODE_PH_WH, SV_CODE_PH_FR

The SV_CODE_PH_WH, SV_CODE_PH_FR (Satellite Code Phase—Whole Chips, and Satellite Code Phase—Fractional Chips fields in the Provide Pseudorange Measurement message defined in IS-801-1) may be evaluated as follows. Because the Ephemeris, TIME_REF, and MS position (at TIME_REF) are all known, the MS-to-satellite ranges can be precisely calculated for all visible satellites. Before further processing, these ranges are corrected for each of the following 1. GPS simulator to BS simulator time offset
2. Propagation delay offsets
3. Reported MOB_SYS_T_OFFSET (Mobile System Time Offset field in the Provide Pseudorange Measurement message defined in IS-801-1)
4. Any known error introduced by the GPS simulator (for example, selective availability effects or ionospheric delay effects)

After all the above corrections are made, the error between the calculated ranges and the measured ranges will be determined, ignoring the returned values for which PS_RANGE_RMS_ER (Pseudo-range RMS Error field in the Provide Pseudorange Measurement message defined in IS-801-1) was set to '111111' by the MS. The resulting pseudo-range error ensemble will be evaluated with a $\sigma_1$, $\sigma_2$ type test. Note that in the mixed SNR case, different error limits may be specified for the high SNR and the low SNR SVs (space vehicles).

It is known that the returned pseudo-range measurements may contain a bias caused by the offset between the MS system time and GPS time. In order to eliminate this bias, the average error will be deducted from the individual pseudo-range errors, and again, the residual errors will be evaluated with a $\sigma_1$, $\sigma_2$ type test. Both the uncorrected, 'absolute' and corrected, 'relative' pseudo-range errors will be evaluated, and the specified accuracy levels are typically stricter in the corrected case than what they are in the uncorrected case.

PS_DOPPLER

The error represented in the returned PS_DOPPLER (Pseudodoppler field in the Provide Pseudorange Measurement message defined in IS-801-1) may be evaluated as follows. Because the Ephemeris, TIME_REF, and MS position are all known, the true satellite Doppler shift value can be calculated. In the case of the moving scenario, the calculation of the true Doppler also has to take into account the non-zero MS velocity. The difference between the true Doppler values and the returned pseudo Doppler values will be calculated to obtain the Doppler error, ignoring the values for which PS_RANGE_RMS_ER was set to '111111'.

It is known that the returned pseudo Doppler measurements may contain a bias caused by the offset between the MS clock frequency and true GPS frequency. In order to eliminate this bias, the average error will be deducted from the individual Doppler errors, and the residual errors will be evaluated with a $\sigma_1$, $\sigma_2$ type test. For the Doppler errors, only these corrected, 'relative' measurement errors will be evaluated.

SV_CNO

The log ratio between the returned SV_CNO (Satellite C/N$_O$ field in the Provide Pseudorange Measurement message defined in IS-801-1) value and the nominal value prescribed for that test will be calculated. Then the absolute value of the computed error ratios will be determined, where the error ratios are expressed in units of 1 dB. Ignore the values for which PS_RANGE_RMS_ER was set to '111111'. The resulting ensemble of absolute values will be evaluated with a $\sigma_1$, $\sigma_2$ type test. Note that the SNR is set at the GPS simulator in such a way that the nominal value at the MS antenna input connector is achieved. This involves correcting GPS simulator settings to account for all cable, connector and combiner losses. Because of this, no SNR correction in the test evaluation process will be necessary.

PS_RANGE_RMS_ER

For checking the returned PS_RANGE_RMS_ER (Pseudorange RMS Error field in the Provide Pseudorange Measurement message defined in IS-801-1), the following statistics will be calculated. Taking the individual pseudo-ranges, calculate the corrected, 'relative' errors according to the description above, to get $x_i$, where i is the pseudo-range index. Ignore the values for which PS_RANGE_RMS_ER='111111'. Divide each remaining error value with the corresponding RMS value represented by PS_RANGE_RMS_ER to get $x'_i$, $1 \leq i \leq N$, where N is the number of returned pseudo-ranges, for which PS_RANGE_RMS_ER$\neq$'111111'. When determining the RMS value represented by PS_RANGE_RMS_ER, use the median of the appropriate interval specified by Table 3.2.4.2–8 found in the IS-801-1 standard.

Calculate $$R = \sqrt{\sum_{i=1}^{N} x'^2_i}.$$

To pass this test, $A \leq R \leq B$ has to be satisfied, where A and B are the required performance threshold values. With a perfect RMS estimate, $R \approx 1$ would be true, so we could use, for example, A=0.5 and B=2.

Complete GPS Measurement Performance for an MS without Position Calculation Capability A complete test report will typically include the following:

1. Calculated yield
2. Cumulative Distribution Function (CDF) of the response time (measured from reception of request by the MS to reception of all responses by the BS)
3. CDF of the pseudo-range error
4. CDF of the Doppler error
5. CDF of the SV_CNO error
6. The calculated value R for the PS_RANGE_RMS_ER
7. Any other data collected throughout the evaluation that can be useful in determining the MS performance Minimum AFLT Measurement Standard for an MS without Position Calculation Capability It is desirable to test the yield, accuracy and timeliness of the returned pilot phase measurements. Other returned values are also tested, but the accuracy requirements for those values are generally significantly lower, in recognition of the fact that they may have only an indirect effect on the positioning accuracy. Some of the returned values are described below:

PILOT_PN_PHASE

The PILOT_PN_PHASE (Pilot Measured Phase field in the Provide Pilot Phase Measurement message defined in IS-801-1) may be evaluated as follows. Because the simulated base station locations, TIME_REF_MS, and MS position (at TIME_REF_MS) are all known, the MS-to-BS range differences can be precisely calculated for all simulated base stations. Before further processing, these ranges are corrected for each of the following:

1. BS simulator to BS simulator time offset
2. Propagation delay offsets
3. Reported MOB_SYS_T_OFFSET (Mobile System Time Offset field in the Provide Pilot Phase Measurement message defined in IS-801-1)
4. TIME_CRRCTION_REF and TIME_CORRECTION (Reference Time Correction and Time Correction fields in the Provide Base Station Almanac message defined in IS-801-1) values contained in the PDE simulator database After all the above corrections are made, the error between the calculated pilot phases and the measured pilot phases will be determined, ignoring the returned values for which RMS_ERR_PHASE (RMS Error in Phase Measurement field in the Provide Pilot Phase Measurement message defined in IS-801-1) was set to '111111' by the MS. The resulting pilot phase error ensemble will be evaluated with a $\sigma_1$, $\sigma_2$ type test. Note that in mixed SNR cases, different error limits may be specified for the high SNR and for the low SNR pilots.

TOTAL_RX_PWR

The log ratio between the returned TOTAL_RX_PWR (Total Received Power field in the Provide Pilot Phase Measurement message defined in IS-801-1) value and the nominal value prescribed for that test will be calculated. Then the absolute value of the computed error ratios will be determined, where the error ratios are expressed in units of 1 dB. The resulting ensemble of absolute values will be evaluated with a $\sigma_1$, $\sigma_2$ type test. Note that the total power is set at the BS simulator (and at possible additional noise generators simulating interference from orthogonal channels and neighbor cells) in such a way that the nominal value at the MS antenna input connector is achieved. This involves correcting BS simulator settings to account for all cable, connector and combiner losses. Because of this, no correction to the TOTAL_RX_PWR value is necessary in the test evaluation process.

REF_PILOT_STRENGTH

The log ratio between the returned REF_PILOT_STRENGTH (Reference Pilot Strength field in the Provide Pilot Phase Measurement message defined in IS-801-1) value and the nominal value prescribed for that test will be calculated. Then the absolute value of the computed error ratios will be determined, where the error ratios are expressed in units of 1 dB. The resulting ensemble of absolute values will be evaluated with a $\sigma_1$, $\sigma_2$ type test. Note that the SNR is set at the BS simulator (and at possible additional noise generators simulating interference from orthogonal channels and neighbor cells) in such a way that the nominal value at the MS antenna input connector is achieved. This involves correcting BS simulator settings to account for all cable, connector and combiner losses. Because of this, no reference pilot strength correction will be necessary in the test evaluation process.

PILOT_STRENGTH

The log ratio between the returned PILOT_STRENGTH (Pilot Strength field in the Provide Pilot Phase Measurement message defined in IS-801-1) value and the nominal value prescribed for that test will be calculated. Then the absolute value of the computed error ratios will be determined, where the error ratios are expressed in units of 1 dB. Ignore the values for which RMS_ERR_PHASE was set to '111111'. The resulting ensemble of absolute values will be evaluated with a $\sigma_1$, $\sigma_2$ type test. Note that the SNR is set at the BS simulator (and at possible additional noise generators simulating interference from orthogonal channels and neighbor cells) in such a way that the nominal value at the MS antenna input connector is achieved. This involves correcting BS simulator settings to account for all cable, connector and combiner losses. Because of this, no pilot strength correction will be necessary in the test evaluation process.

RMS_ERR_PHASE

For checking the returned RMS_ERR_PHASE (RMS Error in Phase Measurement field in the Provide Pseudorange Measurement message defined in IS-801-1), the following statistics will be calculated. Taking the individual pilot phases, calculate the errors according to the description above, to get $y_i$, where i is the pilot phase index. Ignore the values for which RMS_ERR_PHASE='111111'. Divide each remaining error value with the corresponding RMS value represented by RMS_ERR_PHASE to get $y'_i$, $1 \leq i \leq N$, where N is the number of returned pilot phases, for which RMS_ERR_PHASE≠'111111'. When determining the RMS value represented by RMS_ERR_PHASE, use the median of the appropriate interval specified by Table 3.2.4.2–9 found in the IS-801-1 standard.

Calculate $$R = \sqrt{\sum_{i=1}^{N} y_i'^2}.$$

To pass this test, $A \leq R \leq B$ has to be satisfied, where A and B are the required performance threshold values. With a perfect RMS estimate, $R \approx 1$ would be true, so we could use, for example, A=0.5 and B=2.

Complete AFLT Measurement Performance for an MS without Position Calculation Capability A complete test report will typically include the following:

Calculated yield
Cumulative Distribution Function (CDF) of the response time (measured from reception of request by the MS to reception of all responses by the BS)
CDF of the pilot phase error
CDF of the total Rx power error
CDF of the reference pilot strength error
CDF of the pilot strength error
The calculated value R for the RMS_ERR_PHASE
Any other data collected throughout the evaluation that can be useful in determining the MS performance Evaluation Methods for an MS with Position Calculation Capability In the case of an MS with position calculation capability, the testing will comprise of evaluating the returned Provide Location Response messages. A test from the Section describing the evaluation methods for an MS without position calculation capability should also be included in order to check the protocol compliance of the MS, if it is capable of responding with Provide Pseudorange Measurement or Provide Pilot Phase Measurement messages. As an example, for this purpose, we can select any of the stationary test scenarios, and apply the call flow shown in FIG. 5. An MS can pass this test by either sending acceptable Provide Pseudorange Measurements messages, or sending Reject messages to the PDE's Request Pseudorange Measurement messages with REJ_REQ_TYPE (Reject Request Type field in the Reject message defined in IS-801-1), set to '0100' and REJ_REASON (Reject Reason field in the Reject message defined in IS-801-1) set to '000'.

When collecting the results for a particular measurement, the tester has to wait until the time period specified by PREF_RESP_QUAL (Preferred Response Quality field in the Request Location Response message defined in IS-801-1) expires or until the Provide Location Response message arrives, whichever happens first. A measurement will be declared failed if the Provide Location Response message is not received in the specified time period, or if either the LOC_UNCRTNTY_A or the LOC_UNCRTNTY_P (Location Uncertainty along Axis and Location Uncertainty Perpendicular to Axis fields in the Provide Location Response message defined in IS-801-1) in the response was set to either '11110' or '11111'.

The number of failed measurements will be separately recorded. In order to pass the test, it has to be established that the measurement failure probability is less than $p_f$, or in other words, the yield is greater than $1-p_f$, with at least a 70% confidence level. Note that the relatively low confidence level reflects the practical limits on the number of measurements. Different $p_f$ values may be specified for different test scenarios.

Minimum Standard for an MS with Position Calculation Capability

A primary goal is to test the yield, accuracy and timeliness of the returned location. The other returned values will also be tested but the accuracy requirements for those values should be set significantly lower because the information they convey is of lesser importance. Note that the evaluation procedure is identical in the cases of GPS, AFLT or Hybrid tests, since the MS returns Provide Location Response messages in all cases.

LAT, LONG

Since the TIME_REF_CDMA and MS position (at TIME_REF_CDMA) are known, the true horizontal position and thus, the horizontal position error vector can be directly calculated. Ignore those measurements for which either LOC_UNCRTNTY_A or LOC_UNCRTNTY_P was set to either '11110' or '11111'. Calculate the absolute value of the horizontal position vector, to obtain the horizontal positioning error. The horizontal positioning error ensemble will be evaluated using a $\sigma_1$, $\sigma_2$ type test.

LOC_UNCRTNTY_ANG, LOC_UNCRTNTY_A, LOC_UNCRTNTY_P

The values of the returned LOC_UNCRTNTY_ANG, LOC_UNCRTNTY_A and LOC_UNCRTNTY_P will be jointly tested because the allowable error in LOC_UNCRTNTY_ANG is greatly dependent on the eccentricity of the uncertainty ellipse. To see this, consider that when the eccentricity is very small, the error in the axis angle will be almost evenly distributed over the $[0; \pi/2)$ interval.

For jointly checking the returned LOC_UNCRTNTY_ANG, LOC_UNCRTNTY_A and LOC_UNCRTNTY_P values, the following statistics will be calculated. Compute the individual horizontal position error vectors. Ignore the fixes for which either LOC_UNCRTNTY_A or LOC_UNCRTNTY_P is set to either '11110' or '11111'. Using the values of LOC_UNCRTNTY_ANG, LOC_UNCRTNTY_A and LOC_UNCRTNTY_P, determine the uncertainty ellipse. Compute the distance from the geometric center of the ellipse to the ellipse perimeter along the direction given by the horizontal position error vector. The obtained distance is considered the MS's RMS estimate. Calculate the magnitude of the horizontal position error vector, to obtain the horizontal positioning error. Divide each horizontal positioning error value with the corresponding RMS estimate, to get $z'_i$, $1 \leq i \leq N$, where N is the number of returned fixes, for which LOC_UNCRTNTY_A, LOC_UNCRTNTY_P $\neq$ '11110', '11111'.

Calculate $$R = \sqrt{\sum_{i=1}^{N} z_i'^2}.$$

To pass this test, $A \leq R \leq B$ has to be satisfied, where A and B are the required performance threshold values. With a perfect RMS estimate, $R \approx 1$ would be true, so we could use, for example, $A=0.5$ and $B=2$.

HEIGHT

Only those fixes will be considered for which HEIGHT_INCL is set to '1'. Since the TIME_REF_CDMA and MS position (at TIME_REF_CDMA) are known, the true vertical position can be directly calculated. Note that for some of the proposed test scenarios, the true vertical position may be constant. The error will be computed as the absolute value of the difference between the true vertical position and returned HEIGHT value. Ignore those measurements for which LOC_UNCRTNTY_V was set to either '11110' or '11111'. The vertical position error ensemble will be evaluated using a $\sigma_1$, $\sigma_2$ type test. Since it is not a requirement for the MS to return height values for all measurements, the confidence level may be set at 50%. This means, that the evaluation will become simple thresholding on the error CDF.

LOC_UNCRTNTY_V

For checking the returned LOC_UNCRTNTY_V, the following statistics will be calculated. Take the individual vertical positioning errors calculated according to the description above. Ignore the values for which LOC_UNCRTNTY_V is set to either '11110' or '11111'. Divide each remaining error value with the corresponding RMS value represented by LOC_UNCRTNTY_V, to get $v'_i$, $1 \leq i \leq N$, where N is the number of returned HEIGHT values, for which LOC_UNCRTNTY_V $\neq$ '11110', '11111'.

Calculate $$R = \sqrt{\sum_{i=1}^{N} v_i'^2}$$

To pass this test, $A \leq R \leq B$ has to be satisfied, where A and B are the required performance threshold values. With a perfect RMS estimate, $R \approx 1$ would be true, so we could use, for example, $A=0.5$ and $B=2$.

VELOCITY_HOR, HEADING

The values of the returned VELOCITY_HOR and HEADING will be jointly tested because the allowable error in HEADING is greatly dependent on the magnitude of the horizontal velocity. To see this, consider that for a very small horizontal velocity, the error in heading is almost evenly distributed over the $[0; 2\pi)$ interval.

Only those fixes will be considered for which VELOCITY_INCL is set to '1'. Since the TIME_REF_CDMA and MS position (at TIME_REF_CDMA) are known, the true horizontal velocity can be directly calculated. The error will be computed as the magnitude of the difference between the true horizontal velocity vector and the horizontal velocity vector derived from HEADING and VELOCITY_HOR. The horizontal velocity error ensemble will be evaluated using a $\sigma_1$, $\sigma_2$ type test. Since it is not a requirement for the MS to return horizontal velocity values for all measurements, the confidence level may be set at 50%. This means, that the evaluation will become simple thresholding on the error CDF.

VELOCITY_VER

Only those fixes will be considered for which both FIX_TYPE and VELOCITY_INCL are set to '1'. Since the TIME_REF_CDMA and MS position (at TIME_REF_CDMA) are known, the true vertical velocity can be directly calculated. Note that for some of the proposed test scenarios, the true vertical velocity may always be zero. The error will be computed as the absolute value of the difference between the true vertical velocity and the value represented by VELOCITY_VER. The vertical velocity error ensemble will be evaluated using a $\sigma_1$, $\sigma_2$ type test. Since it is not a requirement for the MS to return vertical velocity values for all measurements, the confidence level may be set at 50%. This means, that the evaluation will become simple thresholding on the error CDF.

CLOCK_BIAS, CLOCK_DRIFT

CLOCK_BIAS and CLOCK_DRIFT will not be tested because the internal GPS receiver clock signal is typically not accessible.

Complete Performance for an MS with Position Calculation Capability

A complete test report will include the following:

Calculated yield

Cumulative Distribution Function (CDF) of the response time (measured from reception of request by the MS to reception of the response by the BS)

CDF of the horizontal positioning error

The value R calculated based on LOC_UNCRTNTY_ANG, LOC_UNCRTNTY_A and LOC_UNCRTNTY_P CDF of the vertical positioning error The value R calculated based on LOC_UNCRTNTY_V CDF of the horizontal velocity error CDF of the vertical velocity error Any other data collected throughout the evaluation that can be useful in determining MS performance GPS Test Scenarios The GPS test scenarios are designed to measure the MS performance under various circumstances. Stated goal is to model real life scenarios; however, in cases when a particular test, which would correlate well with a practical scenario, is not likely to give relevant information, that test should be omitted.

The High SNR cases model an outdoor environment, and they test the dynamic behavior of the MS. The Low SNR cases model a deep indoor environment and they test MS receiver sensitivity. The mixed SNR cases model an indoor environment and they test the linearity of the MS and also its cross-correlation mitigation capability.

The stationary and moving scenarios together test interpretation of the satellite Doppler and possibly the accuracy of the velocity calculation. For the moving scenario, the trajectory is chosen to be a circle centered at the serving BS, so that the RTD could be considered constant.

The unspecified values, such as the exact SNRs for the various cases, are determined based on the desired MS performance requirements. For example, the high SNR levels may be set at −130 dBm, while the low SNR levels may be set at −150 dBm.

There will be two cases distinguished, listed as follows.

MS without position calculation capability

MS with position calculation capability.

The settable parameters, whenever applicable, will always be chosen to be the same in the two cases.

Note that test scenarios for the AFLT and Hybrid cases may be determined in a similar fashion. In all cases, the SNR for the serving base station signals should be set at a level high enough to ensure error-free position location data communication between the BS simulator and the MS.

GPS Test Scenarios for an MS without Position Calculation Capability

FIG. 7 is a table that lists test scenarios for a mobile station with no position calculation capability. In FIG. 7, an 'X' mark in a given cell shows that the corresponding test has to be performed.

Note that the testing of multipath cases should be part of a PDE minimum performance testing.

GPS Test Scenarios for an MS with Position Calculation Capability

FIG. 8 is a table that lists test scenarios for a mobile station with position calculation capability. In FIG. 8, an 'X' mark in a given cell shows that the corresponding test has to be performed.

Note that all shown HDOP values are approximate and not settable during the test. They will be controlled indirectly by setting other parameters.

The foregoing description details certain embodiments of the invention. It will be appreciated, however, that no matter how detailed the foregoing appears, the invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come with the meaning and range of equivalency of the claims are to be embraced within their scope.

I claim:

1. A method for testing assisted position location capable devices, the method comprising:

providing a position determination entity (PDE) simulator that is in communication with a base station simulator;

connecting an assisted position location capable device under test (DUT) to the base station simulator and a global positioning system (GPS) simulator; and initiating a test sequence wherein the DUT receives a set of predetermined GPS signals and at a desired test sequence time the DUT requests assistance data from the base station simulator, and the base station simulator requests assistance data from the PDE simulator, wherein the PDE simulator provides data that is produced in accordance with the DUT message type and system elapsed time, and is produced independently of the GPS simulator data, to the base station and wherein the base station transfers the PDE data to the DUT.

2. A method as defined in claim 1, wherein the PDE data is a set of predetermined responses to any one of a plurality of DUT requests indexed by elapsed test time.

3. A method for testing assisted position location capable devices, the method comprising:

providing a position determination entity (PDE) simulator that is in communication with a base station simulator;

connecting an assisted position location capable device under test (DUT) to the base station simulator and a global positioning system (GPS) simulator; and initiating a test sequence wherein the PDE simulator provides acquisition assistance data that is produced in accordance with system elapsed time and independently of the GPS simulator, and a request for the DUT to make pseudo-range measurements, and the DUT receives the assistance data and the request and using the assistance data makes a pseudo-range measurement and provides the pseudo-range measurement to the base station simulator.

4. A method as defined in claim 3, wherein the PDE data is a set of predetermined responses indexed by elapsed test time.

5. A method for testing assisted position location capable devices, the method comprising:

providing a position determination entity (PDE) simulator that is in communication with a base station simulator;

connecting an assisted position location capable device under test (DUT) to the base station simulator and a global positioning system (GPS) simulator; and initiating a test sequence wherein the PDE simulator provides acquisition assistance data that is produced in accordance with system elapsed time and independently of the GPS simulator, and a request for the DUT to make a location request, and the DUT receives the assistance data and the request and using the assistance data makes a location measurement and provides the location measurement to the base station simulator.

6. A method as defined in claim 5, wherein the PDE data is a set of predetermined responses indexed by elapsed test time.

7. A system for testing assisted position location capable devices, the system comprising:

means for providing a position determination entity (PDE) simulator that is in communication with a base station simulator simulating at least one base station;

means for connecting an assisted position location capable device under test (DUT) to the base station simulator and a global positioning system (GPS) simulator; and means for initiating a test sequence wherein the DUT receives a set of predetermined GPS signals and at a desired time the DUT requests assistance data from the base station simulator and the base station simulator requests assistance data from the PDE simulator, wherein the PDE simulator provides data that is independent of the GPS simulator data to the base station and the base station transfers the PDE data to the DUT.

8. A system for testing assisted position location capable devices, the system comprising:

means for providing a position determination entity (PDE) simulator that is in communication with a base station simulator simulating at least one base station;

means for connecting an assisted position location capable device under test (DUT) to the base station simulator and a global positioning system (GPS) simulator; and means for initiating a test sequence wherein the PDE simulator provides acquisition assistance data and a request for the DUT to make pseudo-range measurements, and the DUT receives the assistance data and the request and using the assistance data makes a pseudo-range measurement and provides the pseudo-range measurement to the base station simulator.

* * * * *